United States Patent [19]
Offutt

[11] 3,874,089
[45] Apr. 1, 1975

[54] THERMAL COUPLER FOR A DRYNESS CONTROL CIRCUIT
[75] Inventor: Carl R. Offutt, St. Joseph, Mich.
[73] Assignee: Whirlpool Corp., Benton Harbor, Mich.
[22] Filed: Aug. 27, 1973
[21] Appl. No.: 391,552

[52] U.S. Cl............................ 34/45, 34/48, 34/53
[51] Int. Cl............................................ F26b 13/04
[58] Field of Search .................... 34/45, 48, 53, 46; 317/235 Q; 324/65 R, 71 SN; 328/3; 307/310, 132; 219/494, 497, 499, 504, 505

[56] References Cited
UNITED STATES PATENTS

| | | | |
|---|---|---|---|
| 3,031,768 | 5/1962 | Kurowski | 34/48 |
| 3,109,717 | 11/1963 | Clapp | 34/45 |
| 3,186,107 | 6/1965 | Raley | 34/53 |
| 3,343,004 | 9/1967 | Ovshinsky | 307/310 |
| 3,393,328 | 7/1968 | Meadows et al. | 317/235 Q |
| 3,394,466 | 7/1968 | Heidtmann | 34/53 |
| 3,444,399 | 5/1969 | Jones | 317/235 Q |
| 3,566,690 | 3/1971 | Ebrahimi | 307/310 |
| 3,571,941 | 3/1971 | Garfield | 34/48 |

Primary Examiner—Charles J. Myhre
Assistant Examiner—Paul Devinsky
Attorney, Agent, or Firm—Hill, Gross, Simpson, Van Santen, Steadman, Chiara & Simpson

[57] ABSTRACT

In a clothes dryer control circuit, a four terminal semiconductor thermal coupler device has input terminals connected in circuit with the heating means and a thermostat of the dryer control circuit and an output including a variable resistance connected in series with the timer motor of the dryer control circuit. The variable resistance changes in response to heating, due to current flow through the input of the device, between low and high values to control energization of the timer motor. The input terminals of the device may be connected in parallel with respect to a thermostat or the heater means, depending on whether the thermal coupler device has a positive or negative temperature coefficient of resistance.

2 Claims, 6 Drawing Figures

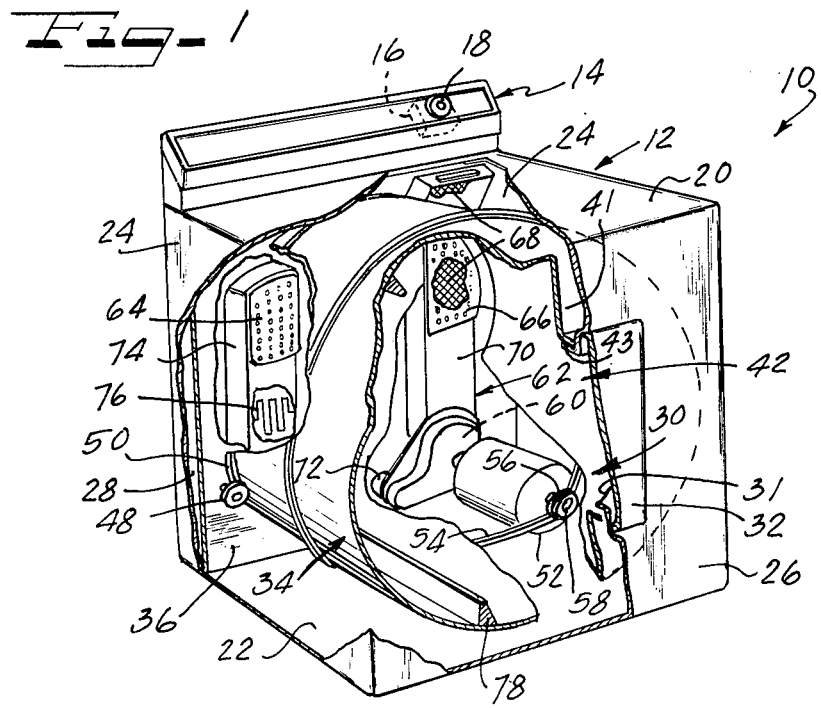
Fig-1
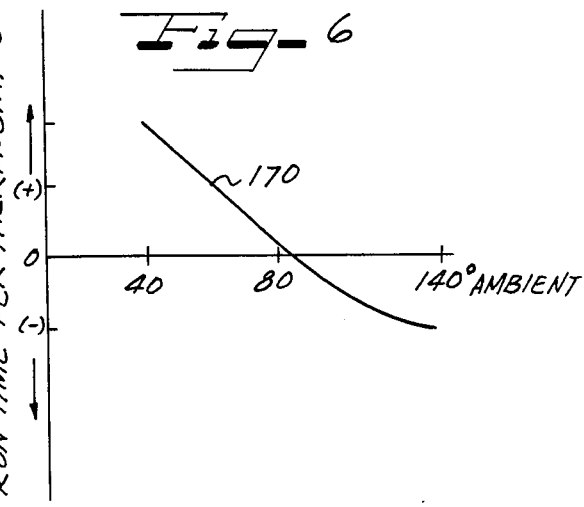
Fig-6
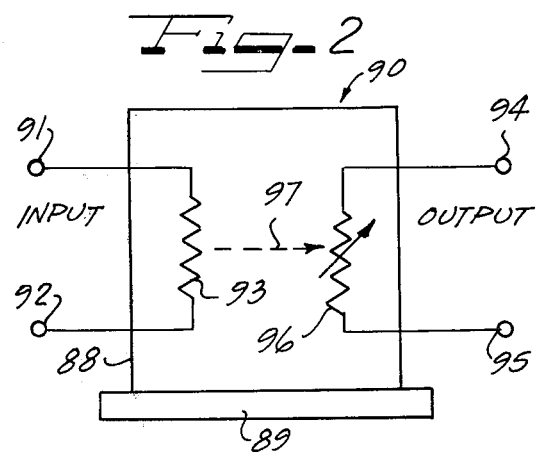
Fig-2
| TIMER SCHEDULE | | | | | | |
|---|---|---|---|---|---|---|
| SWITCH | CYCLE | | | | | |
| CLOSED | TIMED | OFF | AIR | OFF | AUTO DRY DAMP | OFF |
| 144-145 | | | ///// | | ///// | |
| 152-153 | ///// | | | | ///// | |
| 146-147 | ///// | | ///// | | | |
| 148-149 | ///// | | ///// | | | ///// |
Fig-5

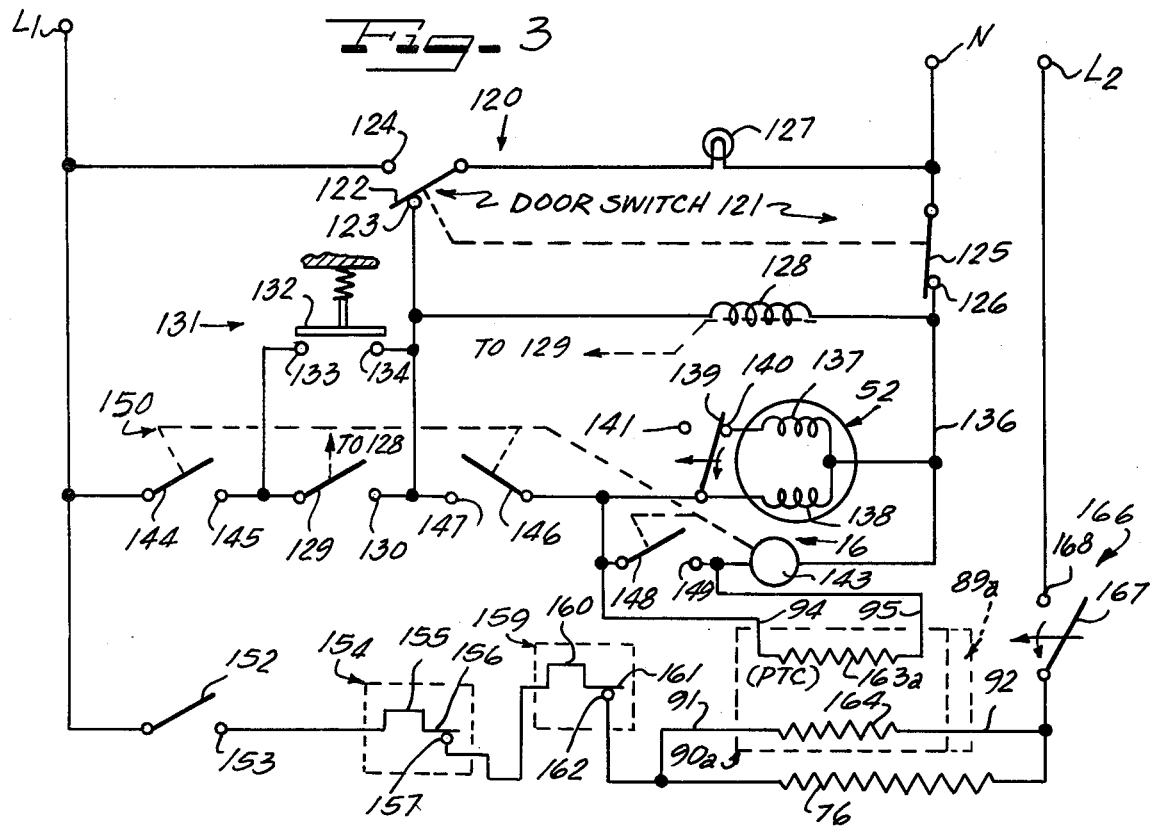
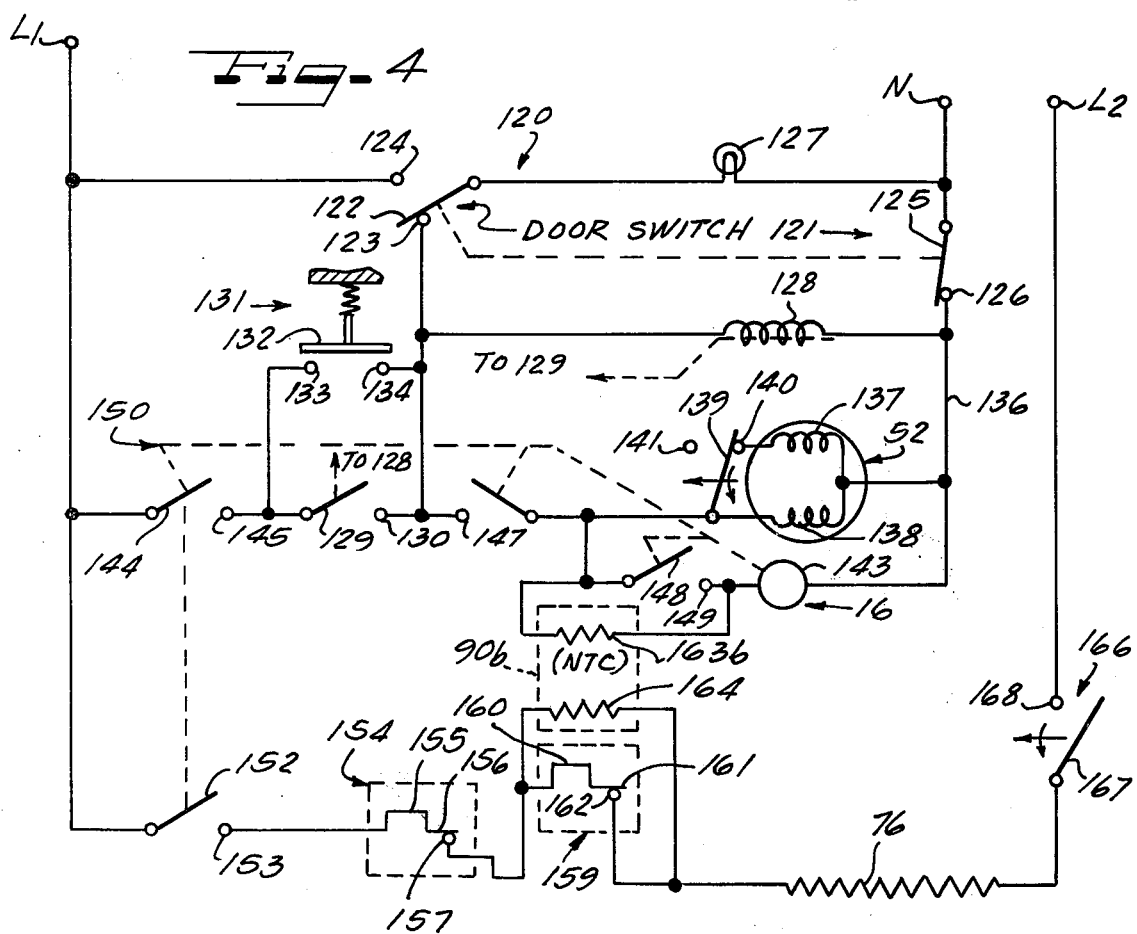

THERMAL COUPLER FOR A DRYNESS CONTROL CIRCUIT

BACKGROUND OF THE INVENTION

1. Field of the Invention

This invention relates to a dryer control circuit, and more particularly to a dryer control circuit in which the timer motor is energized or de-energized in accordance with the state of energization of the heating circuit and to a dryer control circuit in which there is electrical control, but electrical isolation, between the heating circuit and the timer motor.

2. Description of the Prior Art

It is well known in the art to isolate the heating circuit of a dryer control from the timer motor circuit. For example, Richard L. Garfield and Harold S. Stacik, in their U.S. Pat. No. 3,571,941, issued Mar. 23, 1971 and assigned to Whirlpool Corporation, disclose a dryer control circuit in which there is an electrical connection between the timer motor and the heater; however, a set of timer contacts is provided for isolating these circuits to prevent energization of the heater during a cool down portion of the drying cycle. It is also known in the art to employ a bimetal switch operated by a heater to terminate operation of a drying cycle as disclosed in U.S. Pat. No. 3,109,717. In addition, it is also known in the art to utilize temperature responsive devices in the winding of a motor for the purpose of speed regulation.

SUMMARY OF THE INVENTION

A primary object of the present invention is to provide an automatic dryer control which utilizes a thermostat to control the operation of a timer motor and to electrically isolate the timer motor control from the thermostat to prevent the possibility of energization of the heater by way of the timer motor circuit at the thermostat.

Another object of the invention is to control the energization of the timer motor of a dryer control circuit in accordance with the state of energization of the heater circuit.

A further object of the invention is to provide a circuit connection between the heating circuit and the timer motor of a dryer control for electrical control of the timer motor by the heating circuit while at the same time electrically isolating the timer motor from the heating circuit.

A still further object of the invention is to provide an automatic dryer control which compensates for ambient condition and load size variations.

A dryer control includes a heating circuit including a heater, at least one thermostat, and a set of timer contacts all connected in series. A timer motor is connected for energization at different times during a drying cycle by way of a plurality of contacts including timer operated contacts. A semiconductor thermal coupler is connected between the heating circuit and the timer motor. The thermal coupler includes a pair of input terminals connected to the heating circuit and a pair of output terminals connected in series with the timer motor. Between the output terminals is a temperature responsive resistance which changes from a very low value to a very high value, or vice versa, in response to current flow through the input terminals. In one embodiment the input terminals are in series with the thermostat and heater control timer contacts and the thermal coupler has a positive temperature coefficient of resistance; whereas, in another embodiment the input terminals are connected in parallel with the thermostat and the thermal coupler has a negative temperature coefficient of resistance.

BRIEF DESCRIPTION OF THE DRAWINGS

Other objects, features and advantages of the invention, its organization, construction and operation will be best understood from the following detailed description of preferred embodiments of the invention taken in conjunction with the accompanying drawings, in which:

FIG. 1 is a perspective view of a dryer in which the invention may be employed, with certain wall portions of the dryer being removed to show details;

FIG. 2 is a schematic diagram of a thermal coupler device for use in the dryer control of the present invention;

FIG. 3 is a schematic circuit diagram of one embodiment of the invention utilizing a positive temperature coefficient thermal coupler;

FIG. 4 is a schematic circuit diagram of another embodiment of the invention utilizing a negative temperature coefficient thermal coupler;

FIG. 5 is a timer schedule showing the condition of timer controlled contacts during various operating cycles; and FIG. 6 is a graph showing the temperature compensating characteristics of the dryer control.

DESCRIPTION OF THE PREFERRED EMBODIMENTS

Referring to FIG. 1, a clothes drying appliance is generally referenced 10 and is shown as comprising an enclosure cabinet 12 having a control console 14 thereon housing a control device 16 for regulating the drying operation. A control knob 18 is selectively operable to set the control device 16 for programming various drying cycles of operation, as, for example, automatic or timed drying cycles. The enclosure cabinet 12 comprises a horizontal top panel 20 and a horizontal bottom panel 22, a pair of vertical side panels 24 and vertical front and rear panels 26 and 28, respectively. An access opening 30 is provided in the front panel 26 and is defined by an axially in-turned flange 31. A closure door 32 is located in the front panel 26 and cooperates with the access opening 30 for loading and unloading the dryer 10.

The dryer 10 further includes a drying container for tumbling clothes, the container being in the form of a rotatable drum 34 housed within the cabinet 12 and extending axially from the front panel 26 to a bulkhead 36 spaced forwardly of the rear panel 28. To encourage tumbling action in the clothing being dried, a plurality of circumferentially spaced baffles 78 (only one being illustrated) project from the inner surface of the drum 34. The drum 34 includes a radially inward extending front closure wall 41 having an access opening 42 therein formed by means of an axially out-turned flange 43. The flange 43 provides a forwardly extending bearing annulus which overlies and is suitably journaled on the complemental flange 31 of the cabinet 12. It is readily apparent from the foregoing description that the opening 42 into the drum 34 and the opening 30 formed in the front panel 26 are concentric and provide access into the rotatable drum 34 from the outside of the cabinet 12. The drum 34 is supported at the rear by a pair of support rollers 48 (only one being illustrated) mounted on the bulkhead 36. A raceway in the form of a circumferential groove 50 indented into the peripheral wall of the rear portion of the drum 34 serves as a track for the rollers 48.

A drive motor 52 is mounted to the bottom panel 22 in a rear corner of the cabinet 12 and rotatably drives the drum 34 by means of a drive belt 54 extending around the periphery of and in frictional engagement with the drum 34 and around a motor pulley 56 mounted at one end of a motor shaft 58. The other end of the motor shaft 58 drives a blower 60 which is arranged to circulate air through the drum 34. The blower 60 is positioned between the rear panel 28 and the bulkhead 36 and communicates with ductwork generally indicated at 62 forming part of the warm air system for the dryer.

The bulkhead 36 serves to enclose the open-ended rear portion of the drum 34 and provides a fixed rear wall in which is located a pair of spaced openings, comprising an air inlet 64 and an air outlet 66. The blower 60 draws moisture-laden air from the interior of the drum 34 through the outlet 66, through a removable lint screen 68, through an air duct 70 to the blower 60 and then blows the air out of the cabinet 12 through an exhaust duct 72. Air exhausted from the drum 34 is replaced by ambient air entering the warm air system 62 by way of an intake opening in the rear panel 28 (not shown) and is drawn through a fresh air duct 74 passing over a heater means 76 and into the drum 34 through the air inlet 64. The warm air system for the dryer thus circulates a stream of warm air through the drum 34, subjecting clothing placed therein to a drying environment to remove moisture from the fabrics while the clothing is tumbled as the drum rotates.

Referring now to FIG. 2, an exemplary thermal coupler device 90 is schematically illustrated. The device 90 is a four terminal semiconductor device having an outer casing 88. The impedance of the device measured from its input terminals 91, 92 is a constant high value of resistance 93. At its output terminals 94, 95 the device has a resistance 96 which is either a high or low value at ambient temperatures depending on whether the device has a positive temperature coefficient or a negative temperature coefficient of resistance. For the positive temperature coefficient device at normal room ambients and with no input voltage applied to the input terminals 91, 92, the resistance 96 between the output terminals 94, 95 is a relatively low value. When voltage is applied to the input terminals 91, 92, heating occurs within the device (indicated by the broken arrow 97) and the resistance 96 increases about one thousand times. When voltage is removed from the input terminals 91 and 92, the subsequent cooling of the internal semiconductor material causes the output resistance 96 to return to its initial low value. For the negative temperature coefficient device at normal room ambients with no voltage applied to the input terminals 91 and 92, the resistance 96 between the output terminals 94 and 95 is a relatively high resistance. When voltage is applied to the input terminals 91 and 92, heating occurs within the device (also indicated by the broken arrow 97) and the resistance 96 decreases. When voltage is removed from the input terminals, the subsequent cooling of the internal semiconductor material causes the output resistance to return to its initial high value. A metallic heat sink 89 is interconnected with the casing 88 to control the heat transfer from the resistance 96 when voltage is removed from the input terminals 91, 92. Thermal couplers suitable for use in the present invention are available in the TC series of thermal couplers manufactured by Superior Electronics Industries Ltd., Montreal, Quebec, Canada.

Referring now to FIG. 3, a control circuit 120 for use with the dryer of FIG. 1 and utilizing a positive temperature coefficient (PTC) thermal coupler 90a is shown. The control circuit 120 comprises a door operated switch 121 including movable contacts 122 and 125 and stationary contacts 123, 124 and 126 connected between electrical supply terminals L1 and N. A console lamp 127 is connected between the movable contact 122 of the switch 121 and the terminal N. The timer 16 is connectible to the terminal N by way of the contacts 125 and 126 of the switch 121. The timer 16 includes a plurality of contacts which are connected to or connectible to the terminal L1. The timer 16 comprises a timer motor 143 and a plurality of movable contacts 144, 146, 148 and 152 and their associated fixed contacts 145, 147, 149 and 153, respectively. The initial and operational conditions of these contacts can be seen by reference to the timer schedule of FIG. 5 wherein the cross hatched bars represent contact closure and the open bars represent open conditions of the contacts.

The control circuit 120 also comprises the drive motor 52 which is employed to rotatably drive the drum 34 by way of the belt 54. The motor 52 is also connected on one side to the terminal N by way of the contacts 125 and 126 of the switch 121 and a conductor 136 and comprises a start winding 137, a run winding 138, a centrifugally operated movable contact 139, a fixed contact 140 connected to start winding 137, and another fixed contact 141 which is engaged by movable contact 139 when motor 52 is up to speed. The contact 139 is illustrated in the starting position wherein it is closed to the contact 140. The motor 52 is connectible to the terminal L1 by way of the contacts 144–145 and 146–147 of the timer 16 and by way of a pair of contacts 129–130 of a relay 128. For starting purposes, the relay 128 is initially unoperated and its contacts 129 and 130 are open; therefore, a push-to-start switch 131, generally spring loaded to an open condition, is included in the motor starting circuit. The push-to-start switch 131 includes a spring loaded movable contact 132 and a pair of fixed contacts 133–134 which are connected in shunt relation to the contacts 129–130 of the relay 128.

The control circuit also comprises a safety thermostat 154 which is advantageously disposed on the duct 74 adjacent the heating element 76 (a fragmentary portion of duct 74 is removed to show a portion of heating element 76). The thermostat 154 senses the heat being supplied by the heater 76 to the air flowing toward the drum 34. The thermostat 154 includes a heat sensitive element 155 having a movable contact portion 156 which is normally closed to a contact 157 and which is movable to open the contacts 156 and 157. The thermostat 154 is connectible to the terminal L1 by way of the timer contacts 152–153. A second thermostat 159 is connected to contact 157 of the thermostat 154, the second thermostat 159 being disposed near the exhaust end of the air duct 70 to sense the heat of the air flowing from the drum 34. The thermostat 159 includes a heat sensitive element 160 having a movable switch contact 161 normally closed to a fixed contact 162. The timer operated contacts 152, 153, the pair of thermostats 154 and 159 and a centrifugally operated switch 166 having a movable contact 167 and a stationary contact 168 provide for the connection of the heating element 76 between the terminals L1 and L2 for completing a 230 volt circuit, for example. The input terminals 91–92 of positive temperature coefficient thermal coupler device 90a are connected across the heater element 76. Therefore, whenever power is supplied to the heating element 76, voltage will also be applied across the input terminals 91–92 of the thermal coupler 90a and the output resistance 163a will increase to a high value.

Therefore, in operation of the automatic drying cycle, after the wet clothes have been loaded into the drum 34, the door 32 is closed and the timer is set for automatic operation wherein the contacts 144–145, 146–147 and 152–153 are initially closed. The amount of timer run time is determined by the dryness level selected by the user on control knob 18. This is represented in FIG. 5 by the Dry and Damp settings under the automatic cycle heading wherein the Dry setting requires more timer run time before cycle termination than the Damp setting. The push-to-start switch 131 is operated to start the motor 52 and upon closure of the switch 166 by centrifugal force, the heater 76 is energized. It should be noted that at this time the contacts 148–149 are open and the timer motor is initially operating through the low resistance 163a of the output of the thermal coupler 90. However, because voltage is now applied across the input resistance 164, the output resistance 163a quickly increases and the increased resistance in series with the timer motor 143 causes the timer motor to cease operation.

As the laundry begins to dry, the exhaust temperature begins to rise and at a predetermined temperature the exhaust thermostat 159 moves the contact element 161 away from the element 162. The voltage is thereby removed from the input resistance 164 of the thermal coupler and the output resistance 163a decreases to its initial low value thereby allowing the timer motor 143 to again begin to operate. Therefore, when the temperature of the exhaust air rises to a predetermined level, operation of the timer motor is initiated under the control of the exhaust thermostat 159.

The exhaust thermostat 159 will open and close the thermostatic switch contact 161 a number of times determined by the amount of moisture contained in the load being dried to allow the timer motor to operate. After the selected timer motor run time has accumulated, the timer motor 143 has advanced to the point at which the contacts 148–149 close to provide a circuit to the timer motor which is independent of the exhaust thermostat 159. This circuit includes the terminal L1, the closed timer contacts 144–145, the closed relay contacts 129–130, the closed timer contacts 146–147 and the closed timer contacts 148–149. The timer motor 143 therefore continues to advance for a certain interval upon which the timer contacts 152–153 are operated to an open condition, thus removing the energizing power from the heater 76. The powering circuit to the motor 52 remains unaffected at this time and the motor continues to run, providing a cool down portion for the cycle. At the end of the cool down portion, the contacts 144–145 are open and the dryer ceases operation.

The timer motor 143 operates and accumulates time only when the thermostat 159 operates to open the circuit to the heating element 76. Therefore by controlling the power dissipated in the input resistance 164 and the amount of heat transferred to the output resistance 163a, a time delay can be created after application of the voltage to the input resistance 164 before the resistance of the output resistance 163a changes. By controlling the heat transfer coefficient between the output resistance 163a and the thermal coupler casing 88 by means of a heat sink 89, a different time delay can be obtained after voltage is removed from the input resistance 164 before the output resistance 163a changes back to its initial low resistance. The difference between the two time delays is the net increase or decrease in timer motor run time per thermostat cycle.

Without this delay per thermostat cycle the dryness of the clothes load with the same timer setting will vary with ambient temperature conditions and load size. With low ambient temperatures, clothes tend to be overdried because the drying efficiency of the heated air is increased, and a longer time would be required to heat the theromstat 159 to the temperature at which it cycles. The same condition exists with small loads, where the exhaust temperature would rise rapidly to trip the thermostat 159, but only a small amount of time would be accumulated on the time before the thermostat 159 would reset. Consequently, for small loads and low ambient temperatures, the net timer motor run time accumulated per thermostat cycle would be lower than for normal loads and ambients. With extremely large loads and at high ambient temperatures, the reverse problem would occur. The net timer motor run time accumulated per thermostat cycle would be greater, thus shortening total drying time and making it more difficult to get the load dry.

The present invention overcomes the above difficulties because the time delay per thermostat cycle is utilized to provide ambient temperature and load size compensation. By designing the time delay curve to the dryer characteristics, a net time delay curve 170 for the positive temperature coefficient thermal coupler, as shown in FIG. 6, can be made to provide more nearly equal dryness for the same timer setting. The PTC thermal coupler of FIG. 4, designed to have the delay characteristics illustrated by curve 170 in FIG. 6, will increase the amount of timer motor run time accumulated per thermostat cycle at relatively low ambient temperatures to decrease total drying time for a selected dryness level. Further, the thermal coupler with these characteristics will decrease the amount of run time per thermostat cycle at relatively high ambient temperatures to increase the total drying time for a given dryness level. Also, because the number of thermostat cycles during a drying cycle is greater for small loads than large loads, the net gain or loss of accumulated time per thermostat cycle will provide load-size compensation.

Referring to FIG. 4, a negative temperature coefficient (NTC) thermal coupler 90b is illustrated in the control circuit 120. Inasmuch as this circuit operates substantially the same as that discussed above with respect to FIG. 3, only a limited description follows. In FIG. 4, the output resistance 163b is initially at a very high value. As the temperature of the exhaust air rises near the end of the drying cycle, the thermostat 159 opens its contacts 161–162 and allows power to be supplied to the input resistance 164 of the coupler 90*b*. This causes the output resistance 163*b* to drop to a low value and the timer motor 143 is permitted to operate. Thus, the timer motor again operates whenever the operating thermostat 159 is open. Ambient temperature compensation is accomplished in the same manner as described above in connection with the PTC thermal coupler of FIG. 3.

In summary, I have disclosed a highly advantageous and desirable use for thermal coupler devices in the control circuit of an automatic dryer, it being readily apparent that the coupler could be employed for other laundry applications.

Although I have described my invention by reference to a particular illustrative embodiment or exemplary embodiments thereof, many changes and modifications of the invention may become apparent to those skilled in the art without departing from the spirit and scope of my invention. I therefore intend to include within the patent warranted hereon all such changes and modifications as may reasonably and properly be included within the scope of my contribution to the art.

The embodiments of the invention in which an exclusive property or privilege is claimed are defined as follows:

1. In combination with a rotatable drum dryer dryer control for controlling drying operations of a dryer having a treatment zone for treating fabrics, comprising:
   a programmer including a timer motor for connection to an electrical supply, and timer contacts operated by said timer motor through a programmed sequence for controlling drying operations;
   heating means for supplying a flow of heated air to the treatment zone including a heating circuit for connection to the electrical supply and comprising a heater and a thermostat connected in series with said heater and thermally coupled to the treatment zone for opening and closing said series circuit in response to predetermined temperatures in the treatment zone; and
   timer control means disposed remotely from said heating means connecting and electrically isolating said timer motor and said heating means, said timer control means comprising a single device having a two terminal input connected to said series circuit, resistance means connected to said two terminal input, a two terminal heat responsive variable impedance output connected to said timer motor and responsive to current flow through said resistance means due to operations of said thermostat to change the impedance of said output between values which are respectively sufficient and insufficient to prevent operation of said timer motor, a casing surrounding said resistance means and said variable impedance means for partially isolating said variable impedance means from the environment and heat sink means connected with said casing for partially coupling said variable impedance means to the environment for controlling the rate of change in impedance of said variable impedance means when said series circuit is open.

2. A dryer control according to claim 1 wherein said dryer control includes compensation means for providing a net gain or loss of timer motor run time per opening and closing of said series circuit by said thermostat.

* * * * *

UNITED STATES PATENT OFFICE
CERTIFICATE OF CORRECTION

PATENT NO. : 3,874,089
DATED : April 1, 1975
INVENTOR(S) : Carl R. Offutt

It is certified that error appears in the above-identified patent and that said Letters Patent are hereby corrected as shown below:

Column 7, claim 1, line 28, after "dryer" (1st occurrence) insert --, a--.

Signed and Sealed this twenty-second Day of July 1975

[SEAL]

Attest:

RUTH C. MASON
Attesting Officer

C. MARSHALL DANN
Commissioner of Patents and Trademarks